United States Patent
Kusumoto et al.

(10) Patent No.: US 6,465,131 B1
(45) Date of Patent: Oct. 15, 2002

(54) LITHIUM SECONDARY CELL WITH A STANNOUS ELECTRODE MATERIAL

(75) Inventors: Yasuyuki Kusumoto, Moriguchi; Masahisa Fujimoto, Osaka; Shin Fujitani, Hirakata, all of (JP)

(73) Assignee: Sanyo Electric Co., Ltd., Osaka (JP)

(*) Notice: Subject to any disclaimer, the term of this patent is extended or adjusted under 35 U.S.C. 154(b) by 137 days.

(21) Appl. No.: 09/588,338

(22) Filed: Jun. 6, 2000

(30) Foreign Application Priority Data

Jun. 28, 1999 (JP) ............................. 11-181452

(51) Int. Cl.[7] .............................. H01M 4/40; H01M 4/58
(52) U.S. Cl. ................. 429/231.1; 429/218.1; 429/231.95
(58) Field of Search ....................... 429/231.1

(56) References Cited

U.S. PATENT DOCUMENTS

| | | |
|---|---|---|
| 3,959,012 A | 5/1976 | Liang et al. |
| 3,988,168 A | 10/1976 | Bruneau |
| 4,223,079 A * | 9/1980 | Margalit ............... 429/194 |
| 4,263,377 A | 4/1981 | Joshi et al. |
| 4,421,835 A * | 12/1983 | Manassen ............... 429/111 |
| 4,816,358 A | 3/1989 | Holleck et al. |
| 5,976,731 A * | 11/1999 | Negoro ............... 429/328 |
| 6,232,021 B1 * | 5/2001 | Negoro ............... 429/328 |

FOREIGN PATENT DOCUMENTS

| | | | |
|---|---|---|---|
| JP | 362237666 A | * 10/1987 | ............ H01M/4/06 |
| JP | 07288123 | 10/1995 | |
| JP | 08203526 | 8/1996 | |

* cited by examiner

*Primary Examiner*—Patrick Ryan
*Assistant Examiner*—Mark Ruthkosky
(74) *Attorney, Agent, or Firm*—Kubovcik & Kubovcik

(57) ABSTRACT

A lithium secondary cell having incorporated therein a positive electrode or negative electrode active substance which is a compound sulfide having substantially the same crystal structure as stannous sulfide (SnS) or a lithium-containing compound sulfide comprising said compound sulfide and lithium contained therein, said compound sulfide comprising at least one transition metal selected from among copper (Cu), vanadium (V), chromium (Cr), manganese (Mn), iron (Fe), cobalt (Co) and nickel (Ni), tin and sulfur. This stabilizes the crystal structure of SnS serving as the active substance, giving the cell practically useful charge-discharge cycle characteristics.

8 Claims, 2 Drawing Sheets

LITHIUM SECONDARY CELL WITH A STANNOUS ELECTRODE MATERIAL

FIELD OF THE INVENTION

The present invention relates to lithium secondary cells comprising a positive electrode, a negative electrode and a nonaqueous electrolyte, and more particularly to improvements in active substances which undergo a reversible electrochemical reaction with lithium ions for use in the positive electrode or negative electrode of such a lithium secondary cell.

BACKGROUND OF THE INVENTION

For use in portable electronic devices such as compact video cameras, portable telephones and notebook personal computers, attention has been directed in recent years to lithium secondary cells, typical of which are lithium ion cells wherein the positive electrode is prepared from a lithium-containing transition metal oxide such as lithium-cobalt oxide ($LiCoO_2$), lithium-nickel oxide ($LiNiO_2$) or lithium-manganese oxide ($LiMn_2O_4$), or manganese dioxide ($MnO_2$), and the negative electrode active substance used is metallic lithium, lithium alloy, carbon material capable of absorbing and desorbing lithium ions, or the like. Among these cells, lithium secondary cells have already been placed into actual use in which the carbon material serves as the negative electrode active substance.

Various materials of active substances other than those mentioned above are proposed for use in lithium cells. For example, U.S. Pat. No. 4,223,079 proposes lithium cells wherein a metal sulfide is used among these materials. Stannous sulfide (SnS) is used as the metal in the proposed lithium cell in an attempt to give improved characteristics to the cell.

However, the metal sulfide used in the proposed lithium cell as an active substance, i.e., stannous sulfide (SnS), is unstable in crystal structure and therefore has the problem that the cell can not be charged and discharged repeatedly and is consequently unusable as a secondary cell because of poor cycle characteristics.

SUMMARY OF THE INVENTION

An object of the present invention is to stabilize the crystal structure of stannous sulfide (SnS) and provide a lithium secondary cell exhibiting practically useful charge-discharge characteristics.

The present invention provides a lithium secondary cell wherein a compound sulfide having substantially the same crystal structure as stannous sulfide (SnS) or a lithium-containing compound sulfide comprising the compound sulfide and lithium contained therein is used as an active substance of one of the positive electrode and the negative electrode of the cell. The compound sulfide comprises at least one transition metal selected from among copper (Cu), vanadium (V), chromium (Cr), manganese (Mn), iron (Fe), cobalt (Co) and nickel (Ni), tin and sulfur. The compound sulfide is represented by the formula $M_xSn_{1-x}S$ wherein M is at least one metal selected from among Cu, V, Cr, Mn, Fe, Co and Ni, and $0.02 \leq x \leq 0.5$.

The compound sulfide having substantially the same crystal structure as stannous sulfide (SnS) or the lithium-containing compound sulfide comprising this compound sulfide and lithium contained therein contains the metal element M (Cu, V, Cr, Mn, Fe, Co or Ni) in the crystal lattice of stannous sulfide (SnS), and the crystal structure of stannous sulfide (SnS) is stabilized with the Sn partly replaced by the metal element M. Accordingly, when the compound sulfide or the lithium-containing compound sulfide is used as an active substance for the positive electrode or negative electrode in fabricating a lithium secondary cell, the cell can be given improved charge-discharge cycle life characteristics. Incidentally, X-ray diffraction, for example, reveals that the compound sulfide has substantially the same crystal structure as stannous sulfide (SnS).

It is desired that the metal element M be selected from among copper (Cu), vanadium (V), chromium (Cr), manganese (Mn), iron (Fe), cobalt (Co) and nickel (Ni) which have been found effective for affording improved charge-discharge cycle life characteristics. It is known that these metal elements M each form a stable compound having a decomposition temperature of at least 1000° C. when combined with sulfur (S) [see, for example, Binary Alloy Phase Diagrams (1986), American Society for Metals, M—S Binary Phase Diagram]. Stated more specifically, a great chemical bond force acts between the metal element M and sulfur (S), causing the element M to occupy part of the crystal lattice of stannous sulfide (SnS) phase to stabilize the crystal structure. This affords improved charge-discharge cycle life characteristics to the lithium secondary cell wherein the compound sulfide or the lithium-containing compound sulfide is used as an active substance.

Other metal elements M, such as cadmium (Cd), indium (In), molybdenum (Mo), lanthanun (La), cerium (Ce), samarium (Sm) and platinum (Pt), which form a compound with sulfur (S) are also expected to be similarly effective for giving improved charge-discharge cycle life characteristics. The upper limit for the proportion x of the metal element M in the compound sulfide is 0.5 because if the proportion x of the metal element M exceeds 0.5, the single phase of metal element M or the sulfide phase will precipitate to impair the effect to improve the cycle life characteristics. In other words, limiting the proportion x of the metal element M to not higher than 0.5 prevents the precipitation of the single phase of metal element M or the sulfide phase to result in a stabilized crystal structure and improved cycle life characteristics.

In the case where the compound sulfide having substantially the same crystal structure as stannous sulfide (SnS) or the lithium-containing compound sulfide is used as a positive electrode active substance, preferably as the negative electrode active substance to be used is a carbon material, such as graphite (natural graphite or artificial graphite), coke or organic fired body, which is capable of electrochemically absorbing and desorbing lithium (Li), Li—Al alloy, Li—In alloy, Li—Al—Mn alloy or like lithium alloy, or metallic lithium. In this case, the final charge voltage is about 3.4 V, and discharge voltage is about 2.9 V.

Among these negative electrode active substances, the carbon material, when used, affords a greater effect to improve the cycle life characteristics. This is attributable to the fact that the carbon material, unlike lithium alloys or metallic lithium, will not grow into dentritic crystals due to charging and discharging and leading to short-circuiting. Additionally, the carbon material is free of the likelihood that sulfur (S) dissolving in a very small amount in the electrolyte reacts with the lithium (Li) in the negative electrode of lithium alloy or metallic lithium to form on the negative electrode surface a compound such as $Li_2S$ [see, for example, Binary Alloy Phase Diagrams, Vol. 2, p. 1500 (1986), American Society for Metals, Li—S Binary Phase Diagram] which will cause inactivation.

Further in the case where the compound sulfide having substantially the same crystal structure as stannous sulfide (SnS) or the lithium-containing compound sulfide is used as the negative electrode active substance, preferable as the positive electrode active substance is a lithium-containing transition metal oxide such as $LiCoO_2$, $LiNiO_2$, $LiMn_2O_4$, $LiMnO_2$, lithium-containing $MnO_2$, $LiCo_{0.5}Ni_{0.5}O_2$ or $LiNi_{0.7}Co_{0.2}Mn_{0.1}O_2$. Available in this case is a lithium secondary cell which is about 1.2 V in final charge voltage and about 0.7 V in discharge voltage. When the compound sulfide having substantially the same crystal structure as stannous sulfide (SnS) or the lithium-containing compound sulfide is used for the negative electrode, more improved cycle life characteristics result than when the sulfide is used for the positive electrode. This is attributable to a lower charge voltage which suppresses decomposition of the electrolyte.

The compound sulfide having substantially the same crystal structure as stannous sulfide (SnS) can be prepared by firing a mixture of the elements constituting the compound sulfide, compounds of the component elements or a mixture of these compounds. Preferably the firing temperature is at least 231° C. to not higher than 880° C. As will be apparent from an Sn—S binary phase diagram [see, for example, Binary Alloy Phase Diagrams, Vol. 2, p. 2004 (1986), American Society for Metals], the reason is that temperatures higher than 880° C. are likely to produce a fired body as melted, with the result that when cooled to room temperature, the body becomes uneven in composition, failing to give a sufficient effect to improve the cycle characteristics. Further temperatures lower than 231° C. permit stannous sulfide (SnS) to remain stable, failing to fully diffuse the metal element M added through the crystal structure of stannous sulfide (SnS) and produce a compound sulfide.

The solvent for the electrolyte for use in the lithium secondary cell of the invention is preferably a solvent mixture of a cyclic carbonate, such as ethylene carbonate, propylene carbonate or butylene carbonate, and a chain carbonate such as dimethyl carbonate, methylethyl carbonate or diethyl carbonate. Also preferable is a solvent mixture of a cyclic carbonate and an ether solvent, such as 1,2-dimethoxyethane or 1,2-diethoxyethane.

The solute to be used is preferably $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ or the like, or a mixture of such compounds. Further usable are a gel polymer electrolyte which is prepared by converting a liquid electrolyte to a gel with a polymer such as polyethylene oxide or polyacrylonitrile, and an inorganic solid electrolyte such as LiI or $Li_3N$. The electrolytes for use in the lithium secondary cell of the invention are not limited to those mentioned above. Further usable without limitations are those comprising a lithium compound serving as a solute having ionic conductivity and a solvent for dissolving or holding the solute therein insofar as such electrolytes are not decomposed by voltage during charging, discharging or preservation.

DETAILED DESCRIPTION OF EMBODIMENTS

Figure 1:
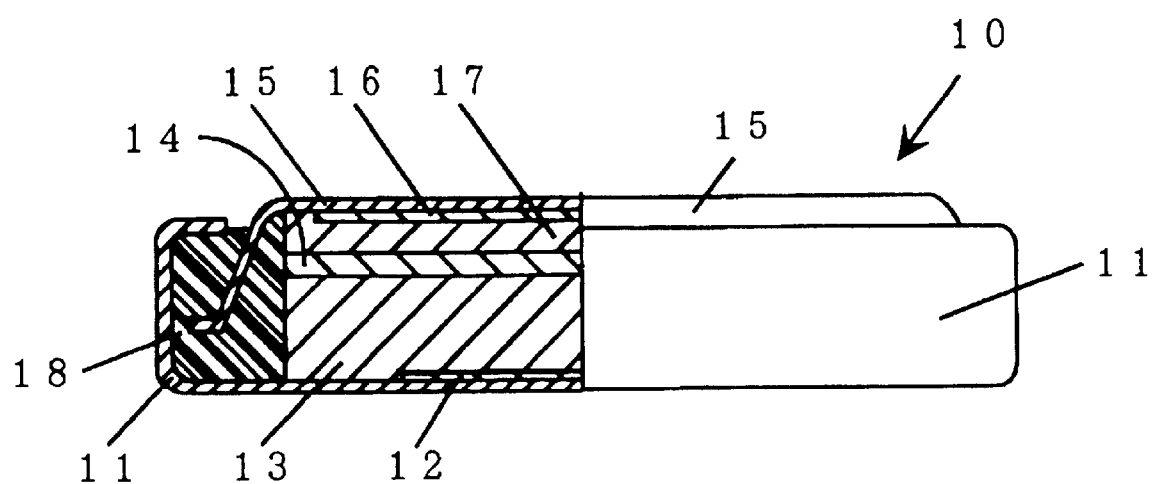
FIG. 1 is a view partly broken away and showing a lithium secondary cell of the invention.

Embodiments of lithium secondary cells of the present invention will be described below in detail, whereas the invention is not limited to these embodiments but can be modified variously by one skilled in the art without departing from the spirit of the invention as set forth in the appended claims.

1. Lithium Secondary Cells wherein Li-Containing Compound Sulfide is Used as Positive Electrode Active Substance (1) Preparation of Positive Electrode Powders of copper (Cu), tin (Sn) and sulfur (S) 99.9% in purity and serving as starting materials were weighed out in the atomic ratio Cu:Sn:S of 0.2:0.8:1, mixed together in a mortar, filled into a mold of 17 mm in diameter and pressed under a pressure of 115 kg/cm² for molding. The molding was thereafter fired in an argon gas atmosphere at a temperature of 400° C. for 10 hours to obtain a fired body of $Cu_{0.2}Sn_{0.8}S$. When analyzed by X-ray diffraction, the fired $Cu_{0.2}Sn_{0.8}S$ body obtained exhibited the same X-ray diffraction pattern as SnS. Presumably, this indicated that the body had substantially the same crystal structure as SnS.

The product was pulverized in a mortar to a mean particle size of 10 ìm. This $Cu_{0.2}Sn_{0.8}S$ powder in an amount of 85 parts by weight, 10 parts by weight of carbon powder serving as an electrically conductive agent and 5 parts by weight of polyvinylidene fluoride were mixed together to obtain a mixture, which was then made into pellets, followed by heat-treatment at 300° C. to prepare positive electrode pellets.

(2) Insertion of Li into Positive Electrode

The positive electrode pellets and metallic lithium were immersed with use of a finely porous membrane of polypropylene in an electrolyte obtained by dissolving $LiPF_6$ in an amount of 1 mole/liter in a solvent mixture of ethylene carbonate (EC) and diethylcarbonate (DEC) in equal volumes. Constant current of 100 ìA was thereafter passed between the metallic lithium and the pellets to effect electrolysis to 2.4 V (2.4 V vs. Li/Li+) relative to the single-electrode potential of lithium and insert lithium into the pellets, whereby a positive electrode (indicated at 13 in FIG. 1) of lithium-containing compound sulfide was prepared.

(3) Preparation of Negative Electrode

A natural graphite powder (95 parts by weight) serving as a negative electrode active substance and 5 parts by weight of polyvinylidene fluoride powder serving as a binder was mixed together, and the mixture was molded under pressure, followed by heat-treatment at 150° C. to prepare a negative electrode (indicated at 17 in FIG. 1) of carbon material. Instead of natural graphite, artificial graphite, coke, organic fired body, or the like is usable.

(4) Preparation of Electrolyte

A nonaqueous electrolyte was prepared by dissolving $LiPF_6$ in an amount of 1 mole/liter in a solvent mixture of ethylene carbonate (EC) and diethylcarbonate (DEC) in equal volumes. Usable in place of the solvent mixture is a solvent mixture of a cyclic carbonate, such as ethylene carbonate, propylene carbonate or butylene carbonate, and a chain carbonate such as dimethyl carbonate, methylethyl carbonate or diethyl carbonate, or a solvent mixture of a cyclic carbonate and an ether solvent, such as 1,2-dimethoxyethane or 1,2-diethoxyethane.

Further usable as the solute instead of $LiPF_6$ is $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ or the like, or a mixture of such compounds. Further usable are a gel polymer electrolyte which is prepared by converting a liquid electrolyte to a gel with a polymer such as polyethylene oxide or polyacrylonitrile, and an inorganic solid electrolyte such as LiI or $Li_3N$.

(5) Fabrication of Cell

A description will not be given of a lithium secondary cell as shown in FIG. 1 and fabricated according to the present embodiment with use of the positive electrode 13 of lithium-containing compound sulfide, the negative electrode 17 of carbon material prepared as above and the electrolyte prepared as described above. First, a positive-electrode can 11 of metal was prepared which had an insulating packing 18 of polypropylene along the inner periphery thereof.

Next, the positive electrode 13 of lithium-containing compound sulfide was placed into the can 11 with a positive-electrode current collector 12 interposed therebetween, and the negative electrode 17 of carbon material and a negative-electrode current collector 16 were arranged over the positive electrode 13, with a separator 14 of finely porous membrane interposed between the electrodes 13 and 17. A negative-electrode can 15 of metal was then placed over the assembly, and the upper end of the positive-electrode can 11 was crimped inwardly thereof to liquid-tightly seal off the resulting assembly, whereby a flat lithium secondary cell 10 was fabricated. The cell thus obtained will be referred to as cell A1.

(6) Investigation of Metal Elements M

Next, an investigation was made on the influence of different kinds of metal elements M used in lithium-containing compound sulfides on the charge-discharge cycle life. For this purpose, flat lithium secondary cells 10 were fabricated in the same manner as above with the exception of using vanadium (V), chromium (Cr), manganese (Mn), iron (Fe), cobalt (Co) or nickel (Ni) in place of copper (Cu) used as a starting material in preparing the lithium-containing compound sulfide. The lithium-containing compound sulfides obtained with use of V, Cr, Mn, Fe, Co or Ni instead of Cu exhibited substantially the same X-ray diffraction pattern as SnS. This appears to indicate that these sulfides have substantially the same crystal structure as SnS.

The flat lithium secondary cell 10 including the positive electrode 13 of lithium-containing compound sulfide ($V_{0.2}Sn_{0.8}S$) incorporating V will be referred to as cell A2, the flat lithium secondary cell 10 including the positive electrode 13 of lithium-containing compound sulfide ($Cr_{0.2}Sn_{0.8}S$) incorporating Cr as cell A3, the flat lithium secondary cell 10 including the positive electrode 13 of lithium-containing compound sulfide ($Mn_{0.2}Sn_{0.8}S$) incorporating Mn as cell A4, and the flat lithium secondary cell 10 including the positive electrode 13 of lithium-containing compound sulfide ($Fe_{0.2}Sn_{0.8}S$) incorporating Fe as cell A5.

Further the flat lithium secondary cell 10 including the positive electrode 13 of lithium-containing compound sulfide ($Co_{0.2}Sn_{0.8}S$) incorporating Co will be referred to as cell A6, and the flat lithium secondary cell 10 including the positive electrode 13 of lithium-containing compound sulfide ($Ni_{0.2}Sn_{0.8}S$) incorporating Ni as cell A7. Further to investigate the influence the absence of the metal element M on the charge-discharge cycle life, a flat lithium secondary cell 10 was fabricated in the same manner as above except that no starting material metal element M was used (SnS). The cell will be referred to as cell B1.

(7) Measurement of Charge-Discharge Cycle Life Characteristics

Cells A1 to A7 and B1 fabricated as described above were charged at a current value of 100 ìA to 3.4 V at 25° C. and thereafter discharged at a current value of 100 ìA to 2.4 V. This cycle was repeated to determine the ratio of the discharge capacity in the 50th cycle to that in the first cycle as a capacity retentivity for each cell. Table 1 below shows the result. The discharge voltage was about 2.9 V on the average, and cells A1 to A7 were 105 to 110 mAh in initial capacity.

TABLE 1

| CELL | POSITIVE ELECTRODE ACTIVE SUBSTANCE (Li - INSERTED) | NEGATIVE ELECTRODE ACTIVE SUBSTANCE | CAPACITY RETENTIVITY (%) |
|---|---|---|---|
| A1 | $Cu_{0.2}Sn_{0.8}S$ | NATURAL GRAPHITE | 85 |
| A2 | $V_{0.2}Sn_{0.8}S$ | NATURAL GRAPHITE | 85 |
| A3 | $Cr_{0.2}Sn_{0.8}S$ | NATURAL GRAPHITE | 84 |
| A4 | $Mn_{0.2}Sn_{0.8}S$ | NATURAL GRAPHITE | 86 |
| A5 | $Fe_{0.2}Sn_{0.8}S$ | NATURAL GRAPHITE | 82 |
| A6 | $Co_{0.2}Sn_{0.8}S$ | NATURAL GRAPHITE | 85 |
| A7 | $Ni_{0.2}Sn_{0.8}S$ | NATURAL GRAPHITE | 85 |
| B1 | SnS | NATURAL GRAPHITE | 5 |

As will be apparent from Table 1 positive electrode 13 of SnS free from any metal element M was as low as 5% in capacity retentivity, whereas cells A1 to A7 each including the positive electrode 13 of lithium-containing compound sulfide incorporating V, Cr, Mn, Fe, Co or Ni as the metal element M were as high as 82 to 86% in capacity retentivity. This indicates that the lithium-containing compound sulfide used as the positive electrode active substance affords improved cycle life characteristics to the lithium secondary cell.

2. Lithium Secondary Cells Wherein Compound Sulfide is Used as Positive Electrode Active Substance (1) Fabrication of Cells Positive electrode pellets were prepared from $Co_{0.2}Sn_{0.8}S$ obtained in the same manner as above and similarly made into positive electrodes 13 of compound sulfide without inserting Li into the pellets. On the other hand, a negative electrode 17 of metallic Li was made from a sheet of metallic Li by blanking in an argon atmosphere, while a negative electrode 17 of Li—Al alloy was made from a sheet of Li—Al alloy (containing 20.6 parts by weight of Li) by blanking in an argon atmosphere. Flat lithium secondary cells 10 were fabricated in the same manner as above using these positive electrodes 13 of compound sulfide and the negative electrodes 17 of metallic Li or Li—Al alloy. The cell wherein metallic Li was used will be referred to as cell A8, and the cell 10 wherein the Li—Al alloy was used as cell A9.

(2) Measurement of Charge-Discharge Cycle Life Characteristics

Next, cells A8 and A9 were discharged at a current value of 100 ìA to 2.4 V at 25° C. to insert Li into the positive electrodes 13 of compound sulfide. The cells were then charged at a current value of 100 ìA to 3.4 V at 25° C. and thereafter discharged at a current value of 100 ìA to 2.4 V. This cycle was repeated to determine the ratio of the discharge capacity in the 50th cycle to that in the first cycle as a capacity retentivity for each cell. Table 2 below shows the result. The average discharge voltage was 2.9 V for cell A8 and 2.5 V for cell A9, and the initial capacity was 108 mAh for both cells.

TABLE 2

| CELL | POSITIVE ELECTRODE ACTIVE SUBSTANCE (WITHOUT INSERTION OF Li) | NEGATIVE ELECTRODE ACTIVE SUBSTANCE | CAPACITY RETENTIVITY (%) |
|---|---|---|---|
| A8 | $Cu_{0.2}Sn_{0.8}S$ | METALLIC Li | 67 |
| A9 | $Cu_{0.2}Sn_{0.8}S$ | Li—Al ALLOY | 71 |

Table 2 reveals that the use of metallic Li or Li—Al alloy as the negative electrode active substance results in an improved capacity retentivity if the compound sulfide is used as the positive electrode active substance. This indicates that the compound sulfide used as the positive electrode active substance affords improved cycle life characteristics to the lithium secondary cell. Although the result given is achieved by the compound sulfide wherein the metal element M is Cu, substantially the same result was attained when the component metal element M of the compound sulfide was V, Cr, Mn, Fe, Co or Ni.

(3) Lithium Secondary Cells Wherein Compound Sulfide is used as Negative Electrode Active Substance (1) Preparation of Positive Electrodes $Li_2CO_3$ and $CoCO_3$ serving as positive electrode active substances were weighed out in such quantities that the Li to Co atomic ratio was 1:1 and were mixed together in a mortar. The mixture was filled into a mold of 17 mm in diameter and pressed under a pressure of 115 kg/cm² for molding. The molding was thereafter fired in air at a temperature of 800° C. for 24 hours to obtain a fired body of $LiCoO_2$. The body was pulverized in a mortar to a mean particle size of 10 ìm for use as a positive electrode active substance. This $LiCoO_2$ powder in an amount of 85 parts by weight, 10 parts by weight of carbon powder serving as an electrically conductive agent and 5 parts by weight of polyvinylidene fluoride were subsequently mixed together to obtain a mixture, which was then made into pellets, followed by heat-treatment at a temperature of 150° C. to prepare positive electrode pellets. A positive electrode 13 of $LiCoO_2$ was made form the pellets.

Similarly a powder of fired body of $LiNiO_2$ was made into positive electrode pellets and then into a positive electrode 13 of $LiNiO_2$. A powder of fired body of $LiMnO_2$ was made into positive electrode pellets and then into a positive electrode 13 of $LiMnO_2$. Instead of $LiCoO_2$, $LiNiO_2$ and $LiMnO_2$, also usable as positive electrode active substances are lithium-containing transition metal compound oxides such as $LiMn_2O_4$ [see, for example, T. Ohzuku, A. Ueda, Solid State Ionics, 69, p.201(1994)], lithium-containing $MnO_2$, $LiCo_{0.5}Ni_{0.5}O_2$ and $LiNiO_{0.7}Co_{0.2}Mn_{0.1}O_2$.

(2) Fabrication of Cells

Next, negative electrodes 17 of compound sulfide were prepared using the $Cu_{0.2}Sn_{0.8}S$ obtained as previously described as a negative electrode active substance. In the same manner as previously described, flat lithium secondary cells 10 were fabricated using the negative electrodes 17 and the above-mentioned positive electrodes (of $LiCoO_2$, $LiNiO_2$ or $LiMnO_2$) 13. The flat lithium secondary cell 10 wherein $LiCoO_2$ was used will be referred to as cell A10, the flat lithium secondary cell 10 wherein $LiNiO_2$ was used as cell A11, and the flat lithium secondary cell 10 wherein $LiMnO_2$ was used as cell A12.

(3) Measurement of Charge-Discharge Cycle Life Characteristics

Cells A10 to A12 fabricated as described above were charged at a current value of 100 ìA to 1.2 V at 25° C. and thereafter discharged at a current value of 100 ìA to 0.2 V. This cycle was repeated to determine the ratio of the discharge capacity in the 50th cycle to that in the first cycle as a capacity retentivity for each cell. Table 3 below shows the result. The discharge voltage was about 0.7 V on the average, and the initial capacity of each cell was 105 mAh.

TABLE 3

| CELL | POSITIVE ELECTRODE ACTIVE SUBSTANCE | NEGATIVE ELECTRODE ACTIVE SUBSTANCE (WITHOUT INSERTION OF Li) | CAPACITY RETENTIVITY (%) |
|---|---|---|---|
| A10 | $LiCoO_2$ | $Cu_{0.2}Sn_{0.8}S$ | 90 |
| A11 | $LiNiO_2$ | $Cu_{0.2}Sn_{0.8}S$ | 94 |
| A12 | $LiMnO_2$ | $Cu_{0.2}Sn_{0.8}S$ | 89 |

Table 3 reveals that the lithium secondary cells are further improved in capacity retentivity by using $LiCoO_2$, $LiNiO_2$, $LiMnO_2$ or like lithium-containing transition metal compound oxide as the positive electrode active substance of the cell and using the compound sulfide $Cu_{0.2}Sn_{0.8}S$ as the negative electrode active substance thereof. Although the result given was achieved by the compound sulfide wherein the metal element M was Cu, substantially the same result was attained when the component metal element M of the compound sulfide was V, Cr, Mn, Fe, Co or Ni.

(4) Investigation of proportion of metal element M in compound sulfide

Next, an investigation was made on the relationship between the proportion of the metal element M in the compound sulfide (composed of Sn, S and metal element M) and the capacity retentivity (charge-discharge cycle life). The compound sulfide used was $Cu_xSn_{1-x}S$, with varying values used for x, i.e., 0.02 ($Cu_{0.02}Sn_{0.98}S$), 0.05 ($Cu_{0.05}Sn_{0.95}S$), 0.1 ($Cu_{0.1}Sn_{0.9}S$), 0.2 ($Cu_{0.2}Sn_{0.8}S$ as used in cell A1), 0.3 ($Cu_{0.3}Sn_{0.7}S$), 0.4 ($Cu_{0.4}Sn_{0.6}S$) and 0.5 ($Cu_{0.5}Sn_{0.5}S$). The sulfides of varying x values were used as positive electrode active substances for preparing positive electrodes 13 of lithium-containing compound sulfides in the same manner as above.

On the other hand, natural graphite was used as a negative electrode active substance to prepare negative electrodes 17 of carbon material. Next, in the same manner as previously described, flat lithium secondary cells 10 were fabricated using the positive electrodes 13 of lithium-containing compound sulfides and the negative electrodes 17 of carbon material. The flat lithium secondary cell 10 wherein $Cu_{0.02}Sn_{0.98}S$ was used will be referred to as cell A13, the flat lithium secondary cell 10 wherein $Cu_{0.05}Sn_{0.95}S$ was used as cell A14, and the flat lithium secondary cell 10 wherein $Cu_{0.1}Sn_{0.9}S$ was used as cell A15.

The flat lithium secondary cell 10 wherein $Cu_{0.3}Sn_{0.7}S$ was used will be referred to as cell A16, the flat lithium secondary cell 10 wherein $Cu_{0.4}Sn_{0.6}S$ was used as cell A17, and the flat lithium secondary cell 10 wherein $Cu_{0.5}Sn_{0.5}S$ was used as cell A18. A flat lithium secondary cell 10, to be referred to as cell B2, was also prepared wherein the x value was 0.6, that is, $Cu_{0.6}Sn_{0.4}S$ was used.

Cells A13 to A18 and B2 thus fabricated were charged at a current value of 100 ìA to 3.4 V at 250° C. and thereafter discharged at a current value of 100 ìA to 2.4 V. This cycle was repeated to determine the ratio of the discharge capacity in the 50th cycle to that in the first cycle as a capacity retentivity for each cell. Table 4 below shows the result. The discharge voltage was 2.9 V on the average, and the initial capacity was 70 to 110 mAh.

TABLE 4

| CELL | POSITIVE ELECTRODE ACTIVE SUBSTANCE (Li - INSERTED) | PROPORTION x | NEGATIVE ELECTRODE ACTIVE SUBSTANCE | CAPACITY RETENTIVITY (%) |
|---|---|---|---|---|
| A13 | $Cu_{0.02}Sn_{0.98}S$ | 0.02 | NATURAL GRAPHITE | 58 |
| A14 | $Cu_{0.05}Sn_{0.95}S$ | 0.05 | NATURAL GRAPHITE | 70 |
| A15 | $Cu_{0.1}Sn_{0.9}S$ | 0.1 | NATURAL GRAPHITE | 82 |
| A1 | $Cu_{0.2}Sn_{0.8}S$ | 0.2 | NATURAL GRAPHITE | 85 |
| A16 | $Cu_{0.3}Sn_{0.7}S$ | 0.3 | NATURAL GRAPHITE | 85 |
| A17 | $Cu_{0.4}Sn_{0.6}S$ | 0.4 | NATURAL GRAPHITE | 71 |
| A18 | $Cu_{0.5}Sn_{0.5}S$ | 0.5 | NATURAL GRAPHITE | 58 |
| B2 | $Cu_{0.6}Sn_{0.4}S$ | 0.6 | NATURAL GRAPHITE | 20 |
| B1 | SnS | 0 | NATURAL GRAPHITE | 5 |

Figure 2:
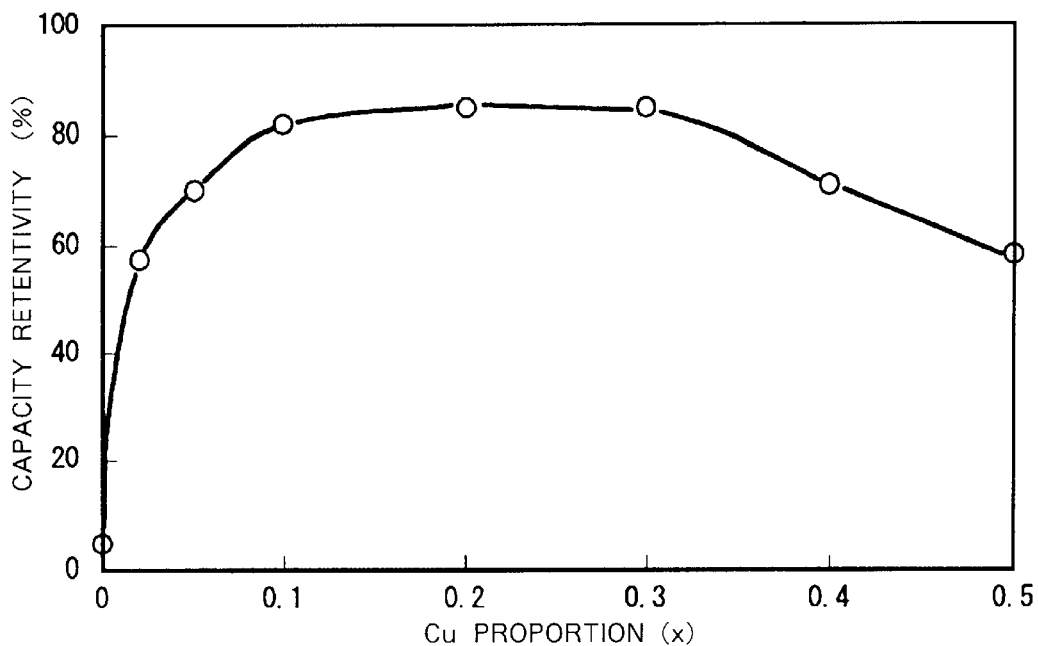
FIG. 2 is a graph showing the relationship between the proportion of metal element M and the capacity retentivity.

As will be apparent from Table 4 and FIG. 2, cell B1 wherein the proportion x of Cu in $Cu_xSn_{1-x}S$ is 0 (SnS) is as low as 5% in capacity retentivity, while cell B2 wherein the proportion x is 0.6 is also low, i.e., 20%, in capacity retentivity, whereas cells A13 to A18 and cell A1, which are at least 0.02 to not greater than 0.5 in proportion x, are improved in capacity retentivity. Especially cells A14 to A17 and cell A1 wherein the lithium-containing compound sulfide used as the positive electrode active substance is at least 0.05 to not greater than 0.4 in proportion x have a further improved capacity retentivity of 70 to 85%. This indicates that the proportion x of Cu in $Cu_xSn_{1-x}S$ is preferably at least 0.02 to not higher than 0.5, more preferably at least 0.05 to not higher than 0.4.

The above result can be interpreted as indicating that if the proportion x of Cu in $Cu_xSn_{1-x}S$ is greater than 0.5, the single phase of Cu or the phase of Cu sulfide starts to precipitate to entail a lower capacity retentivity. On the other hand, it is thought that if the proportion x of Cu in $Cu_xSn_{1-x}S$ is up to 0.5, the single phase of Cu or the phase of Cu sulfide is less likely to precipitate, and Cu becomes incorporated into the crystal lattice of the compound sulfide, giving higher stability to the crystal structure and producing an enhanced effect to improve the capacity retentivity. When the proportion x of Cu is great, the Li-retaining SnS portion diminishes to entail an impaired initial discharge capacity. Although the result given was achieved by the compound sulfide wherein the metal element M was Cu, substantially the same result was attained when the component metal element M of the compound sulfide was V, Cr, Mn, Fe, Co or Ni.

(5) Investigation of Firing Temperature for Compound Sulfide

Next, an investigation was made on the relationship between the firing temperature for preparing the compound sulfide (composed of Sn, S and metal element M) and the capacity retentivity (charge-discharge cycle life). Positive electrodes 13 of lithium-containing compound sulfide were prepared in the same manner as above except that a mixture of materials for obtaining the compound sulfide $Cu_{0.2}Sn_{0.8}S$ was fired in an argon gas atmosphere at a temperature of 200° C., 231° C., 300° C., 500° C., 600° C., 700° C., 800° C., 880° C. or 1000° C. instead of 400° C. (temperature used for fabricating cell A1).

On the other hand, negative electrodes 17 of carbon material were prepared using natural graphite as a negative electrode active substance. Next, in the same manner as previously described, flat lithium secondary cells 10 were fabricated using the positive electrodes 13 of lithium-containing compound sulfide and the negative electrodes 17 of carbon material. The flat lithium secondary cell 10 wherein the positive electrode active substance obtained by firing at 200° C. was used will be referred to as cell A19, the flat lithium secondary cell 10 wherein the positive electrode active substance obtained by firing at 231° C. was used as cell A20, and the flat lithium secondary cell 10 wherein the positive electrode active substance obtained by firing at 300° C. was used as cell A21.

Similarly, the flat lithium secondary cell 10 wherein the positive electrode active substance obtained by firing at 500° C. was used will be referred to as cell A22, the flat lithium secondary cell 10 wherein the positive electrode active substance obtained by firing at 600° C. was used as cell A23, the flat lithium secondary cell 10 wherein the positive electrode active substance obtained by firing at 700° C. was used as cell A24, the flat lithium secondary cell 10 wherein the positive electrode active substance obtained by firing at 800° C. was used as cell A25, the flat lithium secondary cell 10 wherein the positive electrode active substance obtained by firing at 880° C. was used as cell A26, and the flat lithium secondary cell 10 wherein the positive electrode active substance obtained by firing at 100° C. was used as cell A27.

Cells A19 to A27 thus fabricated were charged at a current value of 100 ìA to 3.4 V at 25° C. and thereafter discharged at a current value of 100 ìA to 2.4 V. This cycle was repeated to determine the ratio of the discharge capacity in the 50th cycle to that in the first cycle as a capacity retentivity for each cell. Table 5 below shows the result. Further when the numerical values of Table 5 were plotted on a graph, the result shown in FIG. 3 was obtained. The discharge voltage was 2.9 V on the average, and the initial capacity was 55 to 110 mAh.

TABLE 5

| CELL | FIRING TEMPERATURE (° C.) | CAPACITY RETENTIVITY (%) |
|---|---|---|
| A19 | 200 | 60 |
| A20 | 231 | 72 |
| A21 | 300 | 79 |
| A1 | 400 | 85 |
| A22 | 500 | 86 |
| A23 | 600 | 84 |
| A24 | 700 | 83 |
| A25 | 800 | 80 |
| A26 | 880 | 73 |
| A27 | 1000 | 59 |

Figure 3:
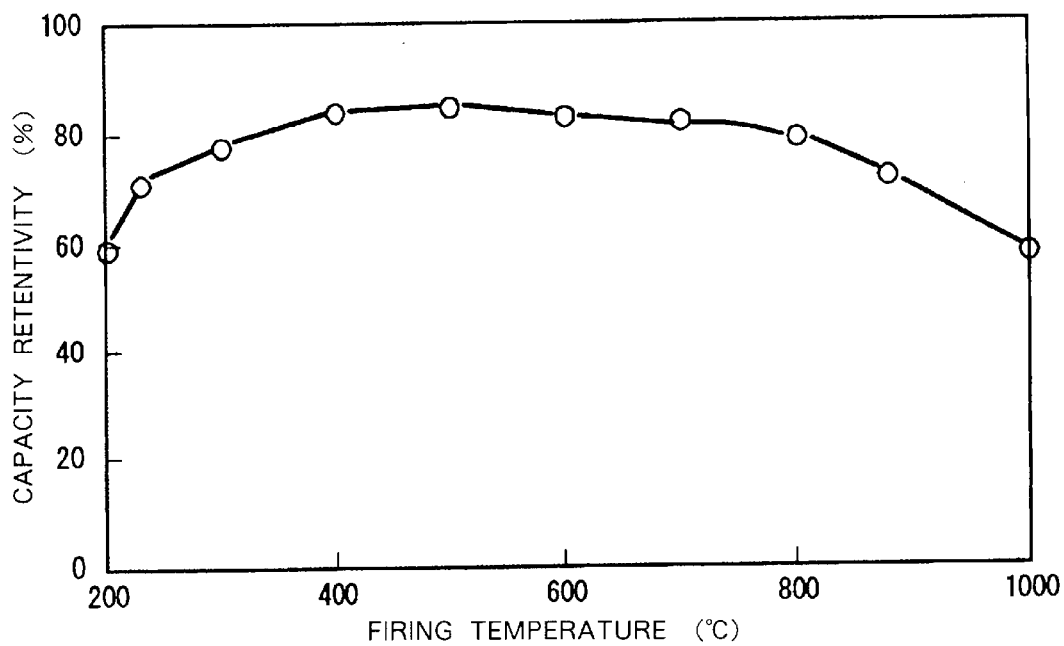
FIG. 3 is a graph showing the relationship between the firing temperature for compound sulfide and the capacity retentivity.

As will be apparent from Table 5 and FIG. 3, the cells were as high as 59 to 86% in capacity retentivity regardless of the firing temperature. Especially firing temperatures of at least 231° C. to not higher than 880° C. resulted in a high capacity retentivity of 72 to 86% and excellent charge-discharge cycle characteristics. This is thought attributable to the fact that as will be apparent from an Sn—S binary alloy phase diagram [see, for example, Binary Alloy Phase Diagrams, Vol. 2, p. 2004(1986), American Society for Metals], temperatures higher than 880° C. will melt the fired body, such that when cooled to room temperature, the body becomes uneven in composition, failing to give a sufficient effect to improve the cycle characteristics.

At temperatures lower than 231° C., on the other hand, SnS presumably remained in the form of a fired body, with the result that the metal element M (Cu in the present case)

added failed to fully diffuse through the crystal structure and to form a compound sulfide. An excessively high firing temperature beyond 880° C. or too low a temperature below 231° C. will not permit sufficient growth of Li-holding SnS crystals. For this reason, an impaired initial discharge capacity was observed. Although the result given was achieved by the compound sulfide wherein the metal element M was Cu, substantially the same result was attained when the component metal element M of the compound sulfide was V, Cr, Mn, Fe, Co or Ni.

As described above, the lithium secondary cell of the invention comprises an active substance wherein a metal element such as Cu, V, Cr, Mn, Fe, Co, Ni or the like is incorporated in the crystal lattice of SnS to stabilize the crystal structure of the SnS. Use of the active substance therefore affords improved charge-discharge cycle life characteristics to the cell, consequently improving the reliability of the device wherein the lithium secondary cell is used as its power source.

What is claimed is:

1. A lithium secondary cell comprising a positive electrode, a negative electrode and a nonaqueous electrolyte, at least one of the positive electrode and the negative electrode having incorporated therein as an active substance thereof a compound sulfide or a lithium-containing compound sulfide comprising said compound sulfide and lithium contained therein, said compound sulfide being represented by the formula $M_xSn_{1-x}S$ wherein M is at least one transition metal selected from the group consisting of copper (Cu), vanadium (V), chromium (Cr), manganese (Mn), iron (Fe), cobalt (Co) and nickel (Ni), and $0.02 \leq x \leq 0.5$.

2. A lithium secondary cell according to claim 1 wherein said compound sulfide or said lithium-containing compound sulfide comprising said compound sulfide and lithium contained therein is used as the active substance of the positive electrode, and a carbon material or a lithium-containing carbon material is used as the active substance of the negative electrode.

3. A lithium secondary cell according to claim 1 wherein a lithium-containing oxide of a transition metal is used as the active substance of the positive electrode, and said compound sulfide or said lithium-containing compound sulfide comprising said compound sulfide and lithium contained therein is used as the active substance of the negative electrode.

4. A lithium secondary cell according to claim 1 wherein said compound sulfide is prepared by firing a mixture of the elements constituting said compound sulfide, compounds of these elements or a mixture of these elements at a temperature of at least 231° C. to not higher than 880° C.

5. An electrode for use in a lithium secondary cell which is one of a positive electrode and a negative electrode constituting the lithium secondary cell and has incorporated therein as an active substance thereof a compound sulfide or a lithium-containing compound sulfide comprising said compound sulfide and lithium contained therein, said compound sulfide being represented by the formula $M_xSn_{1-x}S$ wherein M is at least one transition metal selected from the group consisting of copper (Cu), vanadium (V), chromium (Cr), manganese (Mn), iron (Fe), cobalt (Co) and nickel (Ni), and $0.02 \leq x \leq 0.5$.

6. An electrode according to claim 5 wherein said compound sulfide is prepared by firing a mixture of the elements constituting said compound sulfide, compounds of these elements or a mixture of these elements at a temperature of at least 231° C. to not higher than 880° C.

7. An electrode material for use in a lithium secondary cell for one of a positive electrode and a negative electrode constituting the lithium secondary cell and comprising as an active substance thereof a compound sulfide or a lithium-containing compound sulfide comprising said compound sulfide and lithium contained therein, said compound sulfide being represented by the formula $M_xSn_{1-x}S$ wherein M is at least one transition metal selected from the group consisting of copper (Cu), vanadium (V), chromium (Cr), manganese (Mn), iron (Fe), cobalt (Co) and nickel (Ni), and $0.02 \leq x \leq 0.5$.

8. An electrode material according to claim 7 wherein said compound sulfide is prepared by firing a mixture of the elements constituting said compound sulfide, compounds of these elements or a mixture of these elements at a temperature of at least 231° C. to not higher than 880° C.

* * * * *

UNITED STATES PATENT AND TRADEMARK OFFICE
CERTIFICATE OF CORRECTION

PATENT NO.     : 6,465,131 B1
DATED          : October 15, 2002
INVENTOR(S)    : Yasuyuki Kusumoto et al.

It is certified that error appears in the above-identified patent and that said Letters Patent is hereby corrected as shown below:

<u>Title page,</u>
Item [54], Title, "LITHIUM SECONDARY CELL WITH A STANNOUS ELECTRODE MATERIAL" should be -- LITHIUM SECONDARY CELL WITH A STANNOUS SULFIDE ELECTRODE MATERIAL --.

Signed and Sealed this

Eighteenth Day of February, 2003

JAMES E. ROGAN
*Director of the United States Patent and Trademark Office*